United States Patent [19]
Lindstrom et al.

[11] Patent Number: 5,263,797
[45] Date of Patent: Nov. 23, 1993

[54] SOIL-CEMENT COMPOSITIONS AND METHODS

[75] Inventors: Kurt O. Lindstrom, Duncan; Wendell D. Riley, Marlow, both of Okla.

[73] Assignee: Halliburton Energy Services, Duncan, Okla.

[21] Appl. No.: 998,084

[22] Filed: Dec. 29, 1992

[51] Int. Cl.$^5$ .............................................. E02D 3/12
[52] U.S. Cl. ................... 405/266; 106/718; 106/900; 405/267
[58] Field of Search ............. 405/263, 264, 266, 267, 405/269; 106/692, 694, 695, 713, 718, 900

[56] References Cited

U.S. PATENT DOCUMENTS 4,129,449 12/1978 Kojima .................... 405/266 X
4,514,112 4/1985 Sano et al. ................. 405/269

OTHER PUBLICATIONS

"Chrome-Free Desco® Deflocculant" Drilling Specialties Company (Material Safety Data Sheet), Aug. 16, 1991—pp. 1-6.

*Primary Examiner*—David H. Corbin
*Attorney, Agent, or Firm*—Thomas R. Weaver; C. Clark Dougherty, Jr.

[57] ABSTRACT

The present invention provides improved soil-cement compositions and methods of forming subterranean cementitious masses using the compositions. The soil-cement compositions are basically comprised of hydraulic cement, water present in the compositions in amounts sufficient to form slurries of the solids therein, a dispersant comprised of a mixture of sodium dihydrogen phosphate buffer, ferrous lignosulfonate, ferrous sulfate and tannic acid and soil present in an amount whereby the volume ratio of cement, water and dispersant to soil in the compositions is in the range of from about 0.3:1 to about 2.1:1.

20 Claims, 1 Drawing Sheet

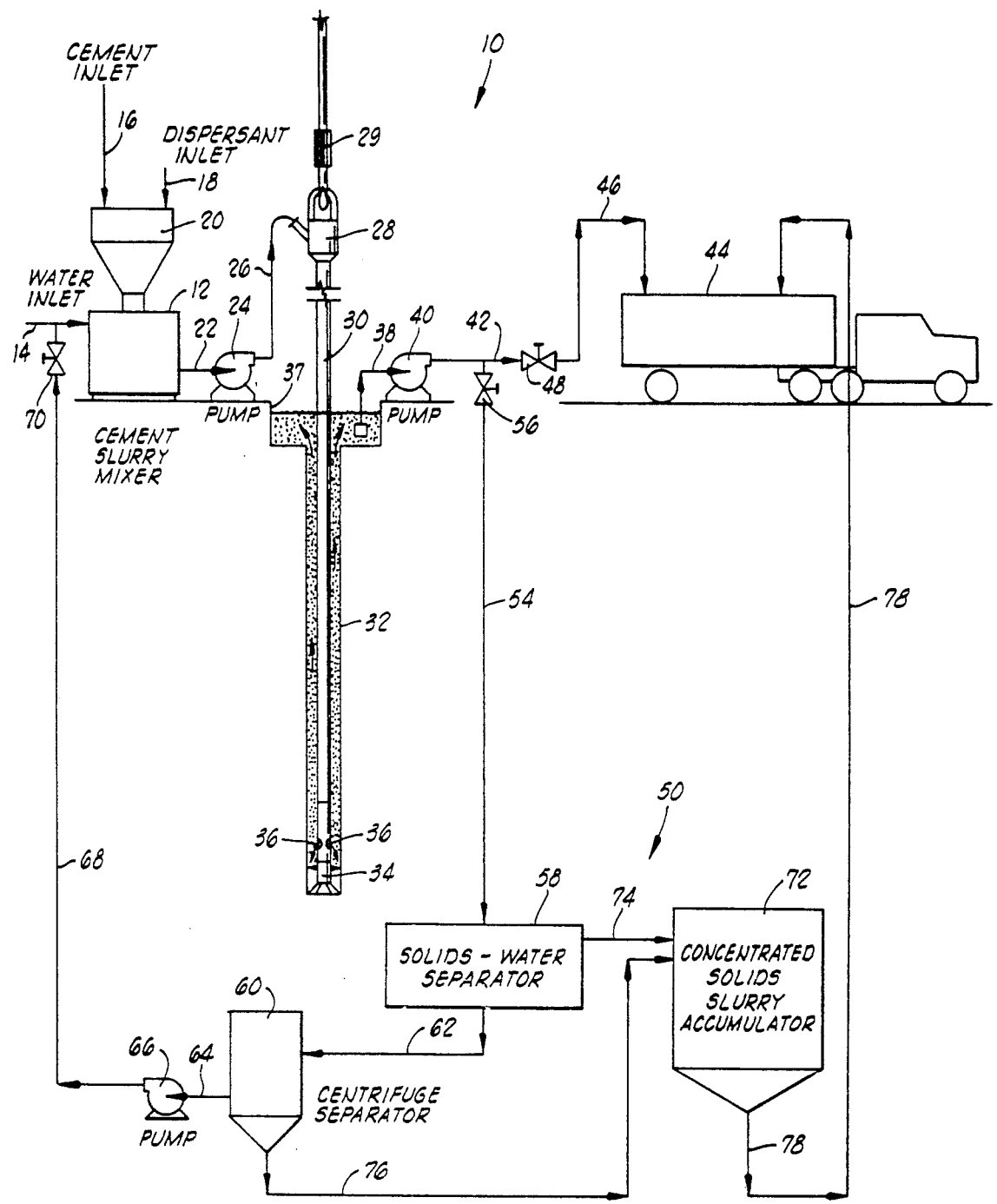

SOIL-CEMENT COMPOSITIONS AND METHODS

BACKGROUND OF THE INVENTION

1. Field of the Invention

The present invention relates generally to soil-cement compositions and methods, and more particularly, to improved soil-cement compositions and methods of utilizing them in jet grouting operations and the like.

2. Description of the Prior Art

A variety of procedures have been developed for forming cementitious subterranean containment walls, foundations, pilings and the like comprised of soil-cement compositions. In such procedures, an aqueous cement slurry containing soil is placed in a subterranean location and allowed to set into a hard cementitious mass having compressive strength therein. The soil-cement compositions which have been utilized have generally been comprised of a hydraulic cement, water, a dispersant and soil. The presence of the soil in the compositions reduces the cost of the compositions as well as the quantities of removed soil to be disposed of.

A relatively simple prior art procedure for forming and placing a soil-cement composition in the ground involves excavating a hole in the ground, mixing a portion of the excavated soil with water and hydraulic cement on the surface, placing the soil-cement composition formed in the hole and allowing it to set into a hard cementitious mass therein. More recently, procedures for simultaneously forming a subterranean cavity and mixing and placing a soil-cement composition therein generally known as "jet grouting" have been developed and used. The jet grouting procedure basically comprises the steps of drilling and/or enlarging a hole in the ground and forming a soil-cement composition therein by means of high velocity jets of an aqueous cement slurry. That is, the aqueous cement slurry is pumped through a string of pipe and through jet forming ports, usually at the bottom of the pipe and/or in a drill connected thereto, at a pressure and rate sufficient to produce high velocity jets of cement slurry which cause soil to be mixed with the cement slurry. A substantial quantity of excess soil-cement slurry is formed in the process which is moved upwardly through the open hole to the surface which often must be removed and disposed of.

Another similar procedure sometimes referred to as the "auger-jet foundation procedure" utilizes a drill connected to a string of pipe which drills a hole in the ground of the approximate size required, and an aqueous cement slurry is mixed with the soil produced at the bottom of the hole by pumping the cement slurry down the string of pipe and through openings therein or in the drill. The auger-jet procedure is different from jet grouting in that high velocity jets of the cement slurry are not utilized to enlarge the hole. The rate of drilling by the drill, i.e., the rate that soil is produced, is controlled in proportion to the rate of cement slurry mixed with the soil to thereby produce a soil-cement composition having desired properties. Again, however, the excess soil-cement composition formed flows out of the hole and generally must be removed and disposed of.

The disposal of the excess soil-cement composition formed has heretofore been and continues to be a problem in both the jet grouting and auger-jet procedures. The soil-cement composition which exits the hole and accumulates on the surface generally has a high viscosity whereby it has only limited pumpability, if any, and moving it to a disposal location has been time consuming and expensive. While various cement and soil dispersants have been utilized in the soil-cement compositions formed in attempts to lower the viscosities of the compositions, such dispersants have not been adequate to alleviate the handling and disposal problems encountered. Thus, there is a need for improved soil-cement compositions and methods of forming such compositions whereby the compositions can be mixed, pumped, processed and disposed of in an easier, cost effective manner.

SUMMARY OF THE INVENTION

The present invention provides improved soil-cement compositions and methods of using such compositions to form hard cementitious masses in subterranean locations which meet the needs described above and overcome the shortcomings of the prior art.

The improved soil-cement compositions have high mixing efficiencies, lower viscosities, fluidities that allow them to be pumped and other highly beneficial properties. The compositions are basically comprised of hydraulic cement, water present in the compositions in an amount sufficient to form slurries of the solids therein, a soil dispersant comprised of a mixture of sodium dihydrogen phosphate buffer, ferrous lignosulfonate, ferrous sulfate and tannic acid, and soil present in the compositions in an amount whereby the volume ratio of cement, water and dispersant to soil is in the range of from about 0.3:1 to about 2.1:1 depending on the type of soil involved and the density of the cement slurry that is utilized.

The methods of forming hard cementitious masses in subterranean locations basically comprise the steps of forming a cement slurry of hydraulic cement, water and a dispersant comprised of a mixture of sodium dihydrogen phosphate buffer, ferrous lignosulfonate, ferrous sulfate and tannic acid, mixing soil with the cement slurry in an amount whereby the volume ratio of the cement slurry to soil in the resulting mixture is in the range of from about 0.3:1 to about 2.1:1 and placing the resulting soil-cement composition in the subterranean location.

Thus, a general object of the present invention is the provision of improved soil-cement compositions and methods of their use.

A further object of the present invention is the provision of soil-cement compositions and methods of using such compositions for forming subterranean cementitous masses wherein the compositions have improved mixing efficiencies, lower viscosities, lower friction pressures and improved pumping and handling properties.

Other and further objects, features and advantages of the present invention will be readily apparent to those skilled in the art upon a reading of the description of preferred embodiments which follows when taken in conjunction with the accompanying drawing.

BRIEF DESCRIPTION OF THE DRAWING

In the drawing, a system of apparatus for carrying out an auger-jet subterranean foundation forming process utilizing the compositions and methods of the present invention is schematically illustrated.

DESCRIPTION OF PREFERRED EMBODIMENTS

As mentioned above, the present invention provides improved soil-cement compositions and methods of using such compositions in the formation of subterranean cementitious containment walls, foundations, pilings and the like. The soil-cement compositions have improved mixing efficiencies, lower viscosities, lower friction pressures and improved pumping and handling properties as compared to prior art soil-cement compositions.

The compositions of this invention are basically comprised of hydraulic cement, water present in an amount sufficient to form a slurry of the solids in the composition; a dispersant for promoting the dispersion of solids in the slurry, and particularly soil therein, and to either maintain the viscosity of the composition at a relatively low level or allow the maximum soil loading possible; and particulate soil present in the composition in an amount whereby the volume ratio of cement, water and dispersant to soil in the composition is in the range of from about 0.3:1 to about 2.1:1.

Any of a variety of hydraulic cements comprised of particulate mixtures of lime, alumina, silica and other materials that will set into hard masses when combined with water can be utilized in accordance with this invention. Suitable such cements include high alumina cements and Portland cements. Portland cements of the various types identified and defined by the American Petroleum Institute and/or the American Society for Testing and Materials are generally preferred, e.g., API Class A Portland cement.

The water utilized in the compositions is preferably fresh water, and it is present in the compositions in an amount sufficient to form a slurry of the solids therein. Generally, the water is present in an amount in the range of from about 8 to about 23 gallons per 100 pounds of cement. Most preferably, the water is present in an amount of about 14 gallons per 100 pounds of cement.

The dispersant which is utilized in accordance with the present invention is comprised of a particulate solids mixture of sodium dihydrogen phosphate buffer, ferrous lignosulfonate, ferrous sulfate and tannic acid. The sodium dihydrogen phosphate is preferably present in the dispersant in an amount such that the weight ratio of sodium dihydrogen phosphate to the other components in the dispersant is about 3.5:1. The dispersant, comprised of a particulate solid mixture of the buffer and other components mentioned above, is generally present in a soil-cement composition of this invention in an amount in the range of from about 1.5 to about 5 pounds of dispersant per 100 pounds of cement. Most preferably, the dispersant is present in the composition in an amount of about 2.5 pounds of dispersant per 100 pounds of cement.

The make up of the soil included in the soil-cement compositions of this invention can vary widely. Generally, any type of soil including sand can be included in the compositions in amounts whereby the volume ratios of cement, water and dispersant to soil in the compositions are within the range of from about 0.3:1 to about 2.1:1. When a major portion of the soil is comprised of water-swellable clays it is generally included in a soil-cement composition in a lesser amount than a soil containing a minor portion of water swellable clays. For most types of soil, a soil-cement composition of this invention preferably contains the soil in an amount whereby the volume ratio of cement, water and dispersant to the soil in the composition is in the range of from about 0.75:1 to about 1.25:1.

A preferred soil-cement composition of this invention is comprised of Portland cement; fresh water present in the composition in an amount of about 14 gallons per 100 pounds of cement; a dispersant comprised of a mixture of sodium dihydrogen phosphate buffer, ferrous lignosulfonate, ferrous sulfate and tannic acid, wherein the weight ratio of sodium dihydrogen phosphate to the other components in the dispersant is about 3.5:1, present in the composition in an amount of about 2.5 pounds of dispersant per 100 pounds of cement; and soil present in the composition in an amount whereby the volume ratio of cement, water and dispersant to soil in the composition is in the range of from about 0.75:1 to about 1.25:1.

The methods of this invention for forming hard cementitious masses in subterranean locations basically comprise the steps of forming a cement slurry of hydraulic cement, water and a dispersant comprised of a mixture of sodium dihydrogen phosphate buffer, ferrous lignosulfonate, ferrous sulfate and tannic acid, mixing soil with the cement slurry in an amount whereby the volume ratio of the cement slurry to soil in the resulting mixture is in the range of from about 0.3:1 to about 2.1:1, and placing the mixture in the subterranean location. After being placed in the location, the mixture sets into a hard mass having compressive strength. Typical subterranean structures which can be formed using the methods of this invention include subterranean containment walls for containing environment polluting materials or the like, subterranean foundations for supporting above the ground structures, subterranean pilings, etc.

The compositions and methods of the present invention are particularly suitable for use in performing jet-grouting and auger-jet procedures. A system of apparatus for forming a subterranean foundation using the jet grouting procedure and the soil-cement compositions and methods of this invention is schematically illustrated in the drawing and generally designated by the numeral 10. The system 10 basically comprises a cement slurry mixer 12 into which water is continuously introduced by way of a conduit 14 connected thereto. Particulate hydraulic cement and the dispersant of this invention are continuously introduced into the mixer 12 by way of conveyors 16 and 18, respectively, which feed into a hopper 20 connected to the mixer 12. If desired the dispersant can be combined with the water or dry blended with the cement prior to introducing the water or cement into the mixer 12. The cement slurry comprised of hydraulic cement, water and dispersant formed in the mixer 12 is continuously withdrawn therefrom by way of a conduit 22 connected to a cement slurry pump 24. The discharge of the pump 24 is connected by a conduit 26 to a swivel 28. The swivel 28 is suspended in a rotary drilling rig (not shown) by the usual block and tackle 29. A string of drill pipe 30 is connected to the swivel 28 which is rotated by a rotary table (not shown) and other drilling rig apparatus. The drill pipe 30 extends into a hole 32 drilled mechanically by a drill 34 connected to the lower end of the pipe 30. In a alternate technique, the hole 32 can be drilled by jetting high velocity streams of an aqueous fluid, e.g., water, from the bottom of the pipe 30. A sub-section of the drill pipe 30 includes a plurality of ports 36 through which the cement slurry pumped by the pump 24 is introduced into the hole 32. That is, the cement slurry formed in the mixer 12 is pumped by the pump 24 into the swivel 28 by way of the conduit 26 connected thereto, through the string of drill pipe 30 and through the ports 36 whereby the cement slurry mixes with particulate soil produced in the hole 32. In the auger-jet procedure, the rate of drilling by the drill, i.e., the rate of particulate soil produced, is controlled in proportion to the rate of cement slurry pumped by the pump 24 and introduced into the hole 32 whereby the cement slurry is mixed with the soil within the hole 32 in the desired volume ratio, i.e., a volume ratio of cement slurry to particulate soil in the range of from about 0.3:1 to about 2.1:1.

Because the soil-cement composition formed in the bottom of the hole 32 is a composition of the present invention and includes the dispersant of the invention, the mixing of the soil with the cement slurry in the hole 32 readily takes place and the resulting composition has a low viscosity. The excess soil-cement composition produced in the hole 32 flows upwardly through the annulus between the sides of the hole and the pipe 30 to the surface. Because of the low viscosity and fluidity of the excess soil-cement composition, it readily flows to the surface and is pumpable. That is, the excess soil-cement composition is pumped from an accumulation pit 37 or the equivalent at the top of the hole 32 by way of a conduit 38 and a pump 40 into an excess soil-cement composition discharge header 42. The header 42 includes a shut-off valve 48 disposed therein.

When a location for disposing of the excess soil-cement composition is nearby, the excess soil-cement composition can be pumped directly from the discharge header 42 into a truck 44 by way of a conduit 46. The truck 44 hauls the excess soil-cement composition to the location of its disposal and returns as required during the performance of the grouting procedure. Once the forming of the hole 32 has been completed with soil-cement composition therein, the pipe 30 is removed from the hole 32 leaving the hole 32 filled or partially filled with the soil-cement composition which sets into a hard mass therein.

When the location of disposal of the excess soil-cement composition formed is a long distance away from the site at which the auger-jet procedure is performed, or when such disposal is otherwise difficult and expensive, the excess soil-cement composition can be processed to concentrate it and thereby reduce the total volume of composition which must be disposed of. A system of apparatus for concentrating the excess soil-cement composition is also illustrated in the drawing and is generally designated by the numeral 50. The system 50 includes a conduit 54 having a shut-off valve 56 disposed therein connected to the excess soil-cement composition discharge header 42 upstream of the valve 48. The conduit 54 leads a stream of the excess soil-cement composition from the discharge header 42 to a separator 58, e.g., a screen separator. The separator 58 functions to separate a water/solids mixture from the soil-cement composition. The water/solids mixture is conducted from the separator 58 to a second separator 60, e.g., a centrifuge separator, by a conduit 62 connected therebetween. Relatively solids free water separated in the separator 60 is withdrawn therefrom by a conduit 64 connected to a pump 66. A conduit 68 connected to the discharge of the pump 66 conducts the water to the conduit 14. The recycled water flows along with additional fresh water into the mixer 12 by way of the conduit 14 wherein it is again utilized for forming a cement slurry. The concentrated solids formed in the separator 58 are conducted to an accumulator 72 by a conveyor 74, and the solids separated from the relatively solids free water in the separator 60 are removed therefrom by way of a conveyor 76. The conveyor 76 conducts the solids to the accumulator 72. The concentrated solids introduced into the accumulator 72 are removed therefrom by way of a conveyor 78. The conveyor 78 discharges the concentrated solids into the truck 44 which hauls them to a location of disposal. Thus, the system 50 for concentrating the excess soil-cement composition produced can be utilized when required as a result of the excess soil-cement composition of this invention being pumpable and processable.

As will be understood by those skilled in the art, depending upon the type of soil in the excess soil-cement composition and other factors, the viscosity and other properties of the excess soil-cement composition can vary appreciably. Thus, the particular system of apparatus utilized for concentrating the excess soil-cement composition may vary appreciably from the system 50 shown in the drawing and described herein.

In order to further illustrate the improved soil-cement compositions and methods of this invention the following examples are presented.

EXAMPLE 1

Various soil-cement compositions were prepared utilizing construction grade cement, fresh water, soil having the x-ray diffraction analysis set forth in Table I below and dispersants. The dispersants tested included the dispersant of the present invention and a commercially available liquid dispersant comprised of polyvinylpyrrolidone and the sodium salt of naphthalene sulfonate condensed with formaldehyde.

TABLE I

Soil[3] Analysis

| Component | Approximate Amounts of Solids, % by Weight of Total Solids |
|---|---|
| quartz | 25 to 30 |
| feldspar | 10 to 15 |
| calcite | 0.5 to 2 |
| kaolinite | 2 to 5 |
| illite | 30 to 40 |
| chlorite | 2 to 5 |
| smectite[1] | 2 to 5 |
| illite/smectite[2] mixed layer clay | 5 to 10 |
| pyrite | 0.5 to 2 |

[1]Smectite was the only swellable clay detected.
[2]The portion of Smectite in this clay is about 20% by weight of the clay.
[3]The water content of the soil was 62% by weight of soil solids.

The soil-cement compositions were mixed in a pint size container using a Waring blender, and each mix included a cement slurry that had a density of about 12.6 pounds per gallon. The dispersants were first prehydrated in the water used for 30 seconds followed by the addition of the cement. The combined components were mixed for 35 seconds. The soil was then added, and the resulting composition was mixed for 60 seconds. The rheologies of the soil-cement compositions were determined by placing the compositions in a Fann Model 35 viscometer and observing the dial readings at 100 rpm at 10 minute time increments. The compositions were maintained in the viscometer under static conditions between dial readings.

Some of the tested soil-cement compositions were cured in 2"×4" cylinders at room temperature and atmospheric pressure for 5 days and/or 28 days, and then measured for compressive strength. The results of the rheology and compressive strength tests are shown in Table II below.

present invention can contain two times as much soil as a soil-cement composition without a dispersant.

EXAMPLE 2

The dispersant of the present invention was also tested with a soil from San Francisco, Calif. which is referred to as "Bay Mud". Bay Mud soil can be characterized as a very soft clay with a trace of fine sand

TABLE II

Soil-Cement Composition Tests

| Test No. | Dispersant Used In Composition | Dispersant Amount, Pounds Per 100 Pounds of Cement | Water Amount, Gallons Per 100 Pounds of Cement | Soil Amount, % By Weight of Cement | Cement Amount, Pounds Per Cubic Foot of Soil-Cement Mixture | Volume Ratio of Cement, Dispersant and Water to Soil |
|---|---|---|---|---|---|---|
| 1 | None | None | 12.15 | 74 | 35 | 2.97:1 |
| 2 | A[1] | 1.6 | 12.15 | 74 | 35 | 2.97:1 |
| 3 | A | 2.4 | 12.15 | 74 | 35 | 2.97:1 |
| 4 | A | 3.9 | 12.15 | 86 | 33.6 | 2.54:1 |
| 5 | B[2] | 1.7 | 12.15 | 86 | 33.6 | 2.54:1 |
| 6 | B | 2.2 | 12.15 | 86 | 33.6 | 2.54:1 |
| 7 | B | 2.2 | 12.15 | 124 | 29.9 | 1.77:1 |
| 8 | A | 4.4 | 12.15 | 105 | 31.6 | 2.08:1 |
| 9 | B | 2.5 | 12.15 | 105 | 31.6 | 2.08:1 |
| 10 | B | 2.5 | 12.15 | 124 | 29.9 | 1.77:1 |
| 11 | B | 2.5 | 12.15 | 150 | 27.8 | 1.46:1 |
| 12 | B | 2.8 | 12.15 | 110 | 31.2 | 2.00:1 |
| 13 | B | 2.8 | 12.15 | 124 | 29.9 | 1.77:1 |
| 14 | B | 2.8 | 12.15 | 150 | 27.8 | 1.46:1 |
| 15 | B | 3.1 | 12.15 | 150 | 27.8 | 1.46:1 |

| Test No. | 100 RPM Viscometer Dial Reading | | | | | | | | Compressive Strength, psi | |
|---|---|---|---|---|---|---|---|---|---|---|
| | Initial | 10 min. | 20 min. | 30 min. | 40 min. | 50 min. | 60 min. | 70 min. | 5 day | 28 Day |
| 1 | 244 | 240 | — | — | — | — | — | — | — | — |
| 2 | 172 | 177 | — | — | — | — | — | — | — | — |
| 3 | 70 | 80 | — | — | — | — | — | — | — | — |
| 4 | 134 | 123 | 130 | — | — | — | — | — | 760 | 1440 |
| 5 | 38 | 88 | — | — | — | — | — | — | — | 1510 |
| 6 | 32 | 40 | 126 | — | — | — | — | — | 800 | 1320 |
| 7 | 78 | 107 | 188 | — | — | — | — | — | — | 1550 |
| 8 | 300+ | — | — | — | — | — | — | — | 810 | 1520 |
| 9 | 47 | 57 | 69 | 141 | — | — | — | — | 790 | — |
| 10 | 68 | 82 | 92 | — | — | — | — | — | — | — |
| 11 | 116 | 156 | 286 | — | — | — | — | — | 820 | 1420 |
| 12 | 29 | — | — | — | — | 119 | 162 | 239 | — | 1490 |
| 13 | 48 | 48 | 69 | 107 | 141 | 225 | 300+ | — | — | 1630 |
| 14 | 69 | 102 | 184 | 248 | 300+ | — | — | — | — | 1560 |
| 15 | 58 | 92 | 174 | — | — | — | — | — | — | 1460 |

[1]Commercially available dispersant, i.e., polyvinylpyrrolidone and sodium naphthalene sulfonate condensed with formaldehyde.
[2]Dispersant of the present invention.

From the results set forth in Table II above, it can be seen that the soil-cement compositions of the present invention have lower viscosities at higher soil loadings as compared to the other compositions tested. In fact, at dispersant concentrations that were estimated to be equal in cost (See Test No. 11 - 2.5 lbs/100 lbs cement of the dispersant of this invention and Test No. 8 - 4.4 lbs/100 lbs cement of the commercially available dispersant), 45% more soil was able to be added to the soil-cement composition of the present invention than to an equivalent composition containing the commercially available dispersant, and the composition of the present invention still had considerably lower rheological properties. That is, the soil-cement composition of Test No. 11 (the present invention) contained soil in the amount of 150% by weight of cement and had an initial viscometer dial reading of 116 compared to the soil-cement composition of Test No. 8 which contained soil in the amount of 105% by weight of cement and had a viscometer dial reading of 300+. Also, it can be seen from Table II that the soil-cement compositions of the and/or silt containing some organics. Its Liquid Limit (LL) is relatively high and is in the order of 72 while its Plastic Index (PI) is in the order of 36. The x-ray diffraction analysis of the soil is set forth in Table III below.

In these tests, two 12 lb/gal cement slurries were prepared, one with and one without dispersant, to form two soil-cement compositions. The cement slurries were first mixed with a Waring blender in standard quart size containers. To form the soil-cement compositions, the cement slurries were added to the soil in quart size containers containing series of stacked blades. The containers were covered and the soil-cement compositions were mixed with a Waring blender.

After mixing, the shear strengths of the soil-cement compositions were determined (after allowing them to remain static for a specified time interval) using a stainless steel shearometer tube. These shear strength test results indicate the relative viscosity/fluidity of the compositions. That is, the more fluid the composition, the lower the shear strength. The results of the tests are given in Table IV below.

TABLE III

Soil[3] Analysis

| Component | Approximate Amounts of Solids, % by Weight of Total Solids |
|---|---|
| quartz | 38 |
| feldspar | 29 |
| calcite | — |
| kaolinite | — |
| illite | 5 |
| chlorite | 3 |
| smectite[1] | 10 |
| illite/smectite[2] mixed layer clay | 10 |
| pyrite | 3 |
| sodium chloride | 2 |

[1]Smectite was the only swellable clay detected.
[2]The portion of Smectite in this clay is about 20% by weight of the clay.
[3]The water content of the soil was 68% by weight of soil solids.

TABLE IV

Dispersant Performance Tests

| Cement Amount, Pounds per Cubic Foot of Soil-Cement Composition | Water Amount, Gallons per 100 Pounds of Cement | Volume Ratio of Cement and Water to Soil[1] | Dispersant Amount, Pounds per 100 Pounds of Cement | Shear Strength, Pounds per Square Foot | | | | 28 Day Compressive Strength, psi |
|---|---|---|---|---|---|---|---|---|
| | | | | 5 min. | 10 min. | 15 min. | 30 min. | |
| 24 | 14.76 | 1.48 | — | 3.4 | — | 9.5 | 17 | 790 |
| 15 | 14.76 | 0.59 | 3.6 | — | 9.4 | — | 12 | 475 |

[1]The water content of the soil was 68% by weight of soil solids.

The results of the tests show that the cement slurry to soil volume ratio can be lowered from 1.48:1 (without dispersant) to 0.59:1 (with dispersant) and still maintain the same approximate shear strength (fluidity). As a result, not only is less cement required in the soil-cement composition of this invention downhole (24 lb/cu ft down to 15 lb/cu ft), but the excess cement material that needs to be disposed of drops from 148% to 59%. Specimens of both soil-cement compositions, cured in 2"×4" cylinders under atmospheric conditions, were found to develop adequate compressive strengths for both "Auger Jet" and Jet grouting applications.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A soil-cement composition which sets into a hard mass consisting essentially of:
   hydraulic cement;
   water present in said composition in an amount sufficient to form a slurry of the solids therein;
   a dispersant consisting essentially of a mixture of sodium dihydrogen phosphate buffer, ferrous lignosulfonate, ferrous sulfate and tannic acid; and
   soil present in said composition in an amount whereby the volume ratio of cement, water and dispersant to soil in said composition is in the range of from about 0.3:1 to about 2.1:1.

2. The composition of claim 1 wherein the weight ratio of sodium dihydrogen phosphate to the other components in said dispersant is about 3.5:1.

3. The composition of claim 1 wherein said water is present in said composition in an amount in the range of from about 8 to about 23 gallons per 100 pounds of cement.

4. The composition of claim 1 wherein said dispersant is present in said composition in an amount in the range of from about 1.5 to about 5 pounds of dispersant per 100 pounds of cement.

5. The composition of claim 2 wherein said water is present in said composition in an amount of about 14 gallons per 100 pounds of cement.

6. The composition of claim 5 wherein said dispersant is present in said composition in an amount of about 2.5 pounds of dispersant per 100 pounds of cement.

7. The composition of claim 6 wherein soil is present in said composition in an amount whereby the volume ratio of cement, water and dispersant to soil in said composition is in the range of from about 0.75:1 to about 1.25:1.

8. A method of forming a hard cementitious mass in a subterranean location comprising:
   forming a cement slurry of hydraulic cement, water and a dispersant consisting essentially of a mixture of sodium dihydrogen phosphate buffer, ferrous lignosulfonate, ferrous sulfate and tannic acid;
   mixing soil with said cement slurry in an amount whereby the volume ratio of cement, water and dispersant to soil in the resulting mixture is in the range of from about 0.3:1 to about 2.1:1; and
   placing said mixture in said subterranean location.

9. The method of claim 8 wherein the weight ratio of sodium dihydrogen phosphate to the other components in said dispersant is about 3.5:1.

10. The method of claim 8 wherein said water is present in said composition in an amount in the range of from about 8 to about 23 gallons per 100 pounds of cement.

11. The method of claim 8 wherein said dispersant is present in said composition in an amount in the range of from about 1.5 to about 5 pounds of dispersant per 100 pounds of cement.

12. The method of claim 9 wherein said water is present in said composition in an amount of about 21 gallons per 100 pounds of cement.

13. The method of claim 12 wherein said dispersant is present in said composition in an amount of about 2.5 pounds of dispersant per 100 pounds of cement.

14. The method of claim 13 wherein soil is present in said mixture of cement slurry and soil in an amount whereby the volume ratio of said cement slurry to soil in said mixture is in the range of from about 0.75:1 to about 1.25:1.

15. A method of forming a cementitious subterranean foundation comprising:
   drilling a subterranean bore hole;

simultaneously pumping a cement slurry of hydraulic cement, water and a dispersant consisting essentially of a mixture of sodium dihydrogen phosphate buffer, ferrous lignosulfonate, ferrous sulfate and tannic acid into said bore hole whereby it mixes with particulate soil produced therein, said cement slurry being pumped into said bore hole at a rate with respect to the rate of particulate soil produced therein whereby said cement slurry is mixed with said soil in a volume ratio in the range of from about 0.3:1 to about 2.1:1;

pumping excess cement slurry-soil mixture produced in said bore hole which overflows said bore hole to a location from where said excess cement slurry-soil mixture is disposed of; and allowing said cement slurry-soil mixture in said bore hole to set into a hard cementitious mass therein.

16. The method of claim 15 wherein the weight ratio of sodium dihydrogen phosphate to the other components in said dispersant is about 3.5:1.

17. The method of claim 15 wherein said dispersant is present in said composition in an amount in the range of from about 1.5 to about 5 pounds of dispersant per 100 pounds of cement.

18. The method of claim 16 wherein said water is present in said composition in an amount of about 14 gallons per 100 pounds of cement.

19. The method of claim 18 wherein said dispersant is present in said composition in an amount of about 2.5 pounds of dispersant per 100 pounds of cement.

20. The method of claim 19 wherein soil is present in said composition in an amount whereby the volume ratio of said cement slurry to soil in said cement slurry-soil mixture is in the range of from about 0.75:1 to about 1.25:1.

* * * * *